United States Patent
Fournier et al.

(10) Patent No.: US 9,085,227 B2
(45) Date of Patent: Jul. 21, 2015

(54) INFINITELY VARIABLE POWER BYPASS TRANSMISSION WITH TWO OPERATING MODES FOR A MOTOR VEHICLE

(75) Inventors: Vincent Fournier, Levallois Perret (FR); Yves Pichon, Boulogne Billancourt (FR)

(73) Assignee: RENAULT S.A.S., Boulogne Billancourt (FR)

( * ) Notice: Subject to any disclaimer, the term of this patent is extended or adjusted under 35 U.S.C. 154(b) by 1437 days.

(21) Appl. No.: 11/578,973

(22) PCT Filed: Apr. 15, 2005

(86) PCT No.: PCT/FR2005/050249
§ 371 (c)(1),
(2), (4) Date: Dec. 20, 2006

(87) PCT Pub. No.: WO2005/105502
PCT Pub. Date: Nov. 10, 2005

(65) Prior Publication Data
US 2007/0221432 A1  Sep. 27, 2007

(30) Foreign Application Priority Data
Apr. 20, 2004 (FR) ..................... 04 04173

(51) Int. Cl.
*B60W 10/02* (2006.01)
*B60K 6/445* (2007.10)
(Continued)

(52) U.S. Cl.
CPC . *B60K 6/445* (2013.01); *B60K 6/48* (2013.01); *B60W 10/02* (2013.01); *B60W 10/08* (2013.01); *B60W 10/105* (2013.01); *B60K 6/365* (2013.01); *B60W 20/00* (2013.01); *F16H 2037/101* (2013.01); *F16H 2037/106* (2013.01); *Y02T 10/6221* (2013.01); *Y02T 10/6239* (2013.01); *Y10T 477/26* (2015.01)

(58) Field of Classification Search
CPC ........ B60K 6/365; B60K 17/00; B60K 6/445; B60K 6/48; B60W 10/02; B60W 10/08; B60W 10/105
USPC .......... 475/5, 209–211, 214–215, 218; 477/3, 477/5; 180/65.2, 65.3, 65.4, 65.22, 65.225, 180/65.23, 65.235, 65.25; 903/921, 922, 903/926

See application file for complete search history.

(56) References Cited

U.S. PATENT DOCUMENTS

| | | |
|---|---|---|
| 5,558,589 A | 9/1996 | Schmidt |
| 5,935,035 A | 8/1999 | Schmidt |

(Continued)

FOREIGN PATENT DOCUMENTS

| | | |
|---|---|---|
| EP | 1 122 110 | 8/2001 |
| EP | 1 275 551 | 1/2003 |

(Continued)

*Primary Examiner* — Roger Pang
(74) *Attorney, Agent, or Firm* — Oblon, McClelland, Maier & Neustadt, L.L.P.

(57) ABSTRACT

An infinitely variable power bypass transmission with two operating modes for a motor vehicle with a thermal engine, including: at least two power lines parallel-connecting the thermal engine with the vehicle wheels and each including a coupling/decoupling device capable of locking or releasing a transmission shaft according to the operating mode; a line including a continuous speed controller; and a mode switch control device configured to control the coupling/decoupling devices. The transmission includes a single actuator for the two coupling/decoupling devices, which is configured to, when a mode switch occurs, trigger simultaneously the two modes while locking the two transmission shafts.

10 Claims, 2 Drawing Sheets

(51) Int. Cl.
  *B60K 6/48* (2007.10)
  *B60W 10/08* (2006.01)
  *B60W 10/105* (2012.01)
  *B60K 6/365* (2007.10)
  *B60W 20/00* (2006.01)
  *F16H 37/10* (2006.01)

(56) References Cited

U.S. PATENT DOCUMENTS

| | | | |
|---|---|---|---|
| 6,258,006 B1 | 7/2001 | Hanyu et al. | |
| 6,520,879 B2 * | 2/2003 | Kawabata et al. | 475/5 |
| 6,540,631 B2 * | 4/2003 | Holmes | 475/5 |
| 6,945,894 B2 * | 9/2005 | Holmes | 475/5 |
| 7,214,156 B2 * | 5/2007 | Oliver | 475/8 |
| 2002/0024306 A1 | 2/2002 | Imai et al. | |
| 2002/0098941 A1 | 7/2002 | Minowa et al. | |
| 2005/0176548 A1 * | 8/2005 | DeVincent et al. | 475/214 |

FOREIGN PATENT DOCUMENTS

| | | |
|---|---|---|
| FR | 2 804 911 | 8/2001 |
| FR | 2 818 346 | 6/2002 |
| FR | 2 823 281 | 10/2002 |
| FR | 2 847 321 | 5/2004 |
| WO | 02 47931 | 6/2002 |
| WO | 02 081246 | 10/2002 |

* cited by examiner

INFINITELY VARIABLE POWER BYPASS TRANSMISSION WITH TWO OPERATING MODES FOR A MOTOR VEHICLE

BACKGROUND OF THE INVENTION

The present invention relates to an infinitely variable power bypass transmission with two operating modes for a motor vehicle fitted with an internal, combustion engine.

Such a power bypass transmission makes it possible to obtain a continuous variation from a reverse ratio to a forward ratio, passing through a particular position called "neutral engaged", in which the speed of movement of the vehicle is zero, for any speed of the internal combustion engine.

There are several types of power bypass transmissions.

According to a first type called "coupled input", the transmission comprises a pair of power bypass pinions which bypass the power at the input of the mechanism and a "combining" epicyclic gear train which recombines the powers at the output of the mechanism. The transmission also comprises a speed variator.

In another type called "coupled output", the transmission comprises a power dividing epicyclic gear train at the input of the mechanism and a pair of power combining pinions at the output of the mechanism. The transmission also comprises a speed variator.

Finally, power bypass transmissions called "two adaptation points" transmissions are known in which a first power dividing epicyclic gear train is placed at the input of the transmission, while a second power combining epicyclic gear train is mounted at the output of the transmission. There again, the transmission comprises a speed variator.

An infinitely variable transmission (IVT) uses only one or two of these three operating principles.

The present invention relates to an infinitely variable transmission using two distinct operating modes and comprising a mode-changing device making it possible to switch from a first operating mode to a second operating mode.

It is understood that it is of value to have two operating modes for one and the same transmission, because that makes it possible to increase the range of transmission ratios and also makes it possible to reduce the dimensions of the speed variator device which may comprise electric machines.

Such bi-mode transmission architectures of known type however have the disadvantage that the mode changes are carried out by multi-disk clutches placed at the transmission output, so that their operation is accompanied by sharp torque variations that are unpleasantly felt by the users. Another disadvantage of such a transmission described for example in U.S. Pat. No. 5,558,589 or in U.S. Pat. No. 5,935,035 lies in the complexity of the architecture, associated particularly with the presence of at least two clutches and a brake.

In a previous French patent application FR 02 14 241 in the name of the applicant, a description was given of an infinitely variable transmission with two operating modes, of the type comprising an electric variator and at least two power bypass lines, a main line whereof connects the internal combustion engine to the drive wheels, and a secondary line is connected to the electric variator, so that at least two operating modes may be applied to the power bypass line of the electric variator.

The infinitely variable transmission described in this prior patent application comprises a first composite epicyclic gear train which makes it possible to connect the internal combustion engine to the wheels of the vehicle along a main power bypass line and a simple epicyclic gear train which makes it possible to achieve the power bypass and a second composite epicyclic gear train, so as to produce a mode-changing system between at least two operating modes of the infinitely variable transmission.

The transmission described in this prior patent application comprises two coupling/decoupling devices which allow two transmission shafts to be independently locked or released in rotation, thereby each time providing one of the operating modes of the transmission.

During a mode change, the two coupling/decoupling devices are controlled independently by two actuators which may be moved by an electric force or a hydraulic force. The two actuators are controlled so that the two modes are engaged simultaneously, the aforementioned two shafts of the transmission being simultaneously locked in rotation.

SUMMARY OF THE INVENTION

The object of the present invention is to simplify this architecture in order to reduce the space requirement of the transmission and its manufacturing cost.

A further object of the invention is an infinitely variable transmission with two operating modes, in which the switch between the two operating modes is carried out in a particularly simple manner.

The infinitely variable power bypass transmission with two operating modes according to the invention, particularly suitable for a motor vehicle fitted with an internal combustion engine, is of the type comprising:
  at least two power lines connecting in parallel the internal combustion engine to the wheels of the vehicle and each containing a coupling/decoupling device capable of locking or releasing a transmission shaft depending on the operating mode;
  a line containing a continuous speed variator;
  and a mode-changing control device capable of controlling the actuation of the coupling/decoupling devices.

The transmission comprises a single actuator for the two coupling/decoupling devices capable, during a change of mode, of simultaneously engaging the two modes while locking the two transmission shafts.

The result of this is a notable simplification relative to the conventional transmissions of this type in which it was necessary to provide a complex control for two independent actuators.

The single actuator is preferably of the dog clutch type and may be driven by a hydraulic force or by an electric force.

The actuator is mounted so that it can be moved in translation parallel to the two transmission shafts.

In a preferred embodiment, the actuator comprises two sets of dog clutch teeth capable of engaging respectively with two sets of matching dog clutch teeth fixedly attached to the two transmission shafts.

Preferably, the two sets of dog clutch teeth of the actuator are axially offset from one another so as to be able to interact simultaneously with the matching sets of dog clutch teeth of the two transmission shafts in one position of the actuator and to be able to interact alternately with one of the matching sets of dog clutch teeth of the two transmission shafts in other positions of the actuator.

During a mode change, the two transmission shafts are thus simply and effectively prevented from rotating simultaneously. On the other hand, for each mode, one of the two shafts is free to rotate while the other is prevented from rotating.

In an advantageous embodiment of the transmission, the continuous speed variator is of the electric type.

Such a speed variator may comprise two traction electric machines or one traction electric machine and one variator electric motor, particularly for producing a hybrid power plant.

The two power lines advantageously each comprise a power dividing epicyclic gear train of which one member is connected to one of the coupling/decoupling devices.

A power combining epicyclic gear train is advantageously mounted at the transmission output. It may comprise an output shaft connected to the wheels of the vehicle, the output shafts of the power dividing train and of the speed variator being connected to the input of said combining train.

BRIEF DESCRIPTION OF THE DRAWINGS

The invention will be better understood on studying an embodiment taken as a nonlimiting example and illustrated by the appended drawings in which.

DESCRIPTION OF THE PREFERRED EMBODIMENTS

Figure 1:
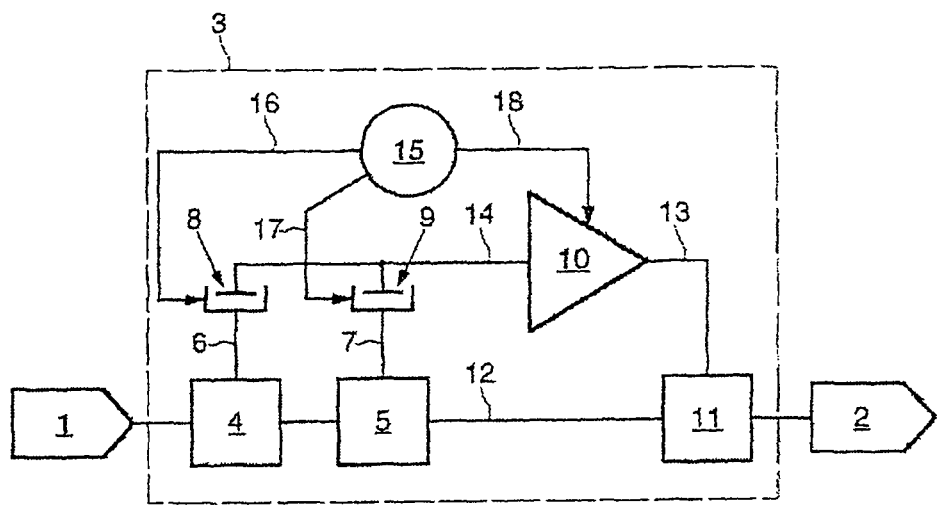
FIG. 1 illustrates schematically the main elements of an infinitely variable transmission with two operating modes according to the invention.

FIG. 1 illustrates schematically the main elements of an embodiment of a transmission according to the invention. An internal combustion engine 1 forms a power plant of a motor vehicle. The axle of the drive wheels of the vehicle, schematized by the block 2, is the driven element. Between the driven element 2 and the internal combustion engine 1, an infinitely variable transmission, reference number 3 in its entirety, is placed.

The transmission 3 comprises two power lines connecting in parallel the internal combustion engine 1 to the wheels 2 of the vehicle. Each of these two power lines comprises a power dividing epicyclic gear train 4, 5 whereof a secondary shaft 6, 7 may be linked in rotation or released by a coupling/decoupling device 8, 9.

The transmission also comprises a power line containing a continuous speed variator schematized by reference number 10. An epicyclic gear train 11 plays the role of a power combining element of all the power lines. Accordingly, the output shaft 12 of the power dividing train 5 and the output shaft 13 of the speed variator 10 are connected to the input of the power combining train 11.

The secondary shafts 6, 7 of the two power dividing trains 4, 5 may be mechanically connected to the input shaft 14 of the speed variator 10 when the coupling/decoupling devices 8, 9 are actuated, so as to couple one or other of the shafts 6, 7 in rotation.

The transmission 3 also comprises a control device 15 for the mode change, capable of controlling the actuation of the two coupling/decoupling devices 8, 9, the control lines being schematized by reference numbers 16 and 17 in FIG. 1. The control device 15 is also capable of controlling the speed variator 10 via the connection 18.

The mode-changing control device 15 is capable of controlling, during a mode change, the two coupling/decoupling devices 8, 9 so as to cause the two power transmission modes to coexist during this period.

Figure 2:
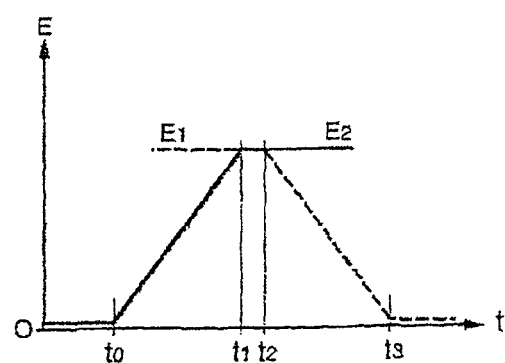
FIG. 2 is a graph showing the switch from one operating mode to another.

FIG. 2 illustrates via a time diagram, the state of engagement E of the two coupling/decoupling devices 8, 9. The state of the coupling/decoupling device 8, reference number $E_1$ in FIG. 2, and the state of the coupling/decoupling device 9, reference number $E_2$ in FIG. 2, are complementary between the times $t_0$ and $t_1$, and between the times $t_2$ and $t_3$. On the other hand, between the times $t_1$ and $t_2$, the two coupling/decoupling devices 8, 9 whose respective states are $E_1$ and $E_2$, are simultaneously engaged, thus making it possible to change mode.

The coupling/decoupling devices 8, 9 may be made in different ways.

Figure 3:
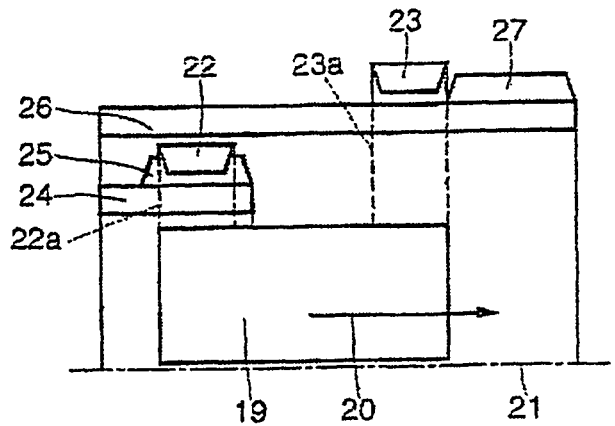
FIGS. 3 to 5 illustrate the various positions of the single actuator according to one embodiment, the assembly being seen in schematic and partial section.
Figure 4:
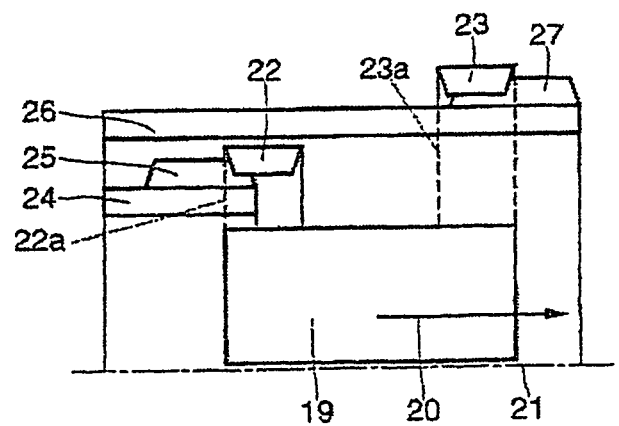
Figure 5:
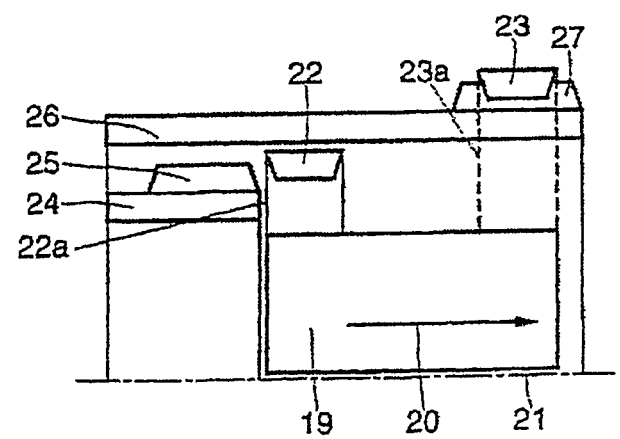

In a preferred embodiment, illustrated in FIGS. 3 to 5, a single actuator 19 is provided for the two coupling/decoupling devices 8, 9 of FIG. 1. The actuator 19 is of the dog clutch type and can be moved in translation along the arrow 20, parallel to the axis 21 of the two transmission shafts 6, 7 schematically indicated in FIG. 1. The actuator 19 has a first set of dog clutch teeth 22 and a second set of dog clutch teeth 23 axially offset relative to the first set. The secondary shaft 6 is fixedly attached to an annular piece 24 which carries a set of dog clutch teeth 25 matching the dog clutch teeth 22 and capable of interacting with the latter. In the same manner, the secondary shaft 7 is fixedly attached to an annular member 26 which carries a set of dog clutch teeth 27 capable of interacting with the dog clutch teeth 23.

It will be noted that, in the example illustrated, the two sets of dog clutch teeth 22, 23 are mounted inside two annular members 22a, 23a fixedly attached to the actuator 19. The two sets of dog clutch teeth 25 and 27 are, for their part, placed on the outer periphery of the respective annular members 24 and 26.

The actuator device 19 operates as follows.

In FIG. 3, the actuator 19 is in a first position, in which the dog clutch teeth 22 are engaged with the dog clutch teeth 25. On the other hand, the dog clutch teeth 23 are completely disengaged from the dog clutch teeth 27. The annular member 24 fixedly attached to the shaft 6 is therefore prevented from rotating, while the annular element 26 fixedly attached to the shaft 7 is free. A rectilinear translation movement, in the direction of the arrow 20 of FIG. 3, moves the two sets of dog clutch teeth 22, 23 into the position illustrated in FIG. 4. In this position, because of the axial offset chosen for the teeth 22 relative to the teeth 23, it can be seen that the dog clutch teeth 22 are partly engaged with the dog clutch teeth 25, while the dog clutch teeth 23 are partly engaged with the dog clutch teeth 27. In this intermediate position, the two shafts 6, 7 are therefore prevented from rotating by the actuator 19. This position corresponds to the mode change phase of the transmission. Specifically, the two modes are simultaneously engaged. A single rectilinear translation movement of the single actuator 19 therefore makes it possible to switch from a first mode to a phase of simultaneous engagement of two modes.

A continuation of the rectilinear translation movement in the direction of the arrow 20 places the actuator 19 in the position illustrated in FIG. 5, in which the dog clutch teeth 22 are disengaged from the dog clutch teeth 25, while the dog clutch teeth 23 are engaged with the dog clutch teeth 27. In this position, the second transmission mode is therefore engaged.

The rectilinear translation movement of the single actuator 19 may be obtained by means of an electric linear actuation device or by the action of a hydraulic force.

Although this example illustrates the use of an actuator furnished with dog clutch teeth, it will be understood that it would be possible to use other types of coupling/decoupling devices, such as clutches, particularly hydraulically controlled.

In the example illustrated, it has been shown that the single actuator was prevented from rotating. It will naturally be understood that the actuator may also be connected to another shaft of the transmission depending on the chosen kinematics.

The invention claimed is:

1. An infinitely variable power bypass transmission with two operating modes for a motor vehicle fitted with an internal combustion engine, comprising:
    at least two power lines connecting in parallel the internal combustion engine to wheels of the vehicle, each power line including a coupling/decoupling device configured to lock or release a transmission shaft depending on the operating mode, and the at least two power lines each comprise a power dividing epicyclic gear train, and each power dividing epicyclic gear train is connected to one of the coupling/decoupling devices;
    a line including a continuous speed variator;
    a mode-changing control device configured to control actuation of the coupling/decoupling devices and to simultaneously engage the two modes while coupling the two transmission shafts, during a change of mode; and
    a single actuator for the two coupling/decoupling devices.

2. The transmission as claimed in claim 1, wherein the actuator is a dog clutch.

3. The transmission as claimed in claim 1, wherein the actuator is driven by a hydraulic force.

4. The transmission as claimed in claim 1, wherein the actuator is driven by an electric force.

5. The transmission as claimed in claim 1, wherein the actuator can be moved in translation parallel to the two transmission shafts.

6. The transmission as claimed in claim 1, wherein the actuator comprises two sets of dog clutch teeth configured to engage respectively with two sets of matching dog clutch teeth fixedly attached to the two transmission shafts.

7. The transmission as claimed in claim 6, wherein the two sets of dog clutch teeth of the actuator are axially offset from one another so as to be configured to interact simultaneously with the matching sets of dog clutch teeth of the two transmission shafts in one position of the actuator and to be configured to interact alternately with one of the matching sets of dog clutch teeth of the two transmission shafts in other positions of the actuator.

8. The transmission as claimed in claim 1, wherein the continuous speed variator is electric.

9. The transmission as claimed in claim 1, further comprising a power combining epicyclic gear train including an output shaft connected to the wheels of the vehicle, the output shafts of the power dividing trains and of the speed variator being connected to the input of the power combining epicyclic gear train.

10. The transmission as claimed in claim 1, wherein the mode-changing control device is connected to the two coupling/decoupling devices and the continuous speed variator.

* * * * *